(12) United States Patent
Murase et al.

(10) Patent No.: US 10,358,126 B2
(45) Date of Patent: Jul. 23, 2019

(54) DRIVING SUPPORT APPARATUS

(71) Applicant: MITSUBISHI JIDOSHA KOGYO KABUSHIKI KAISHA, Tokyo (JP)

(72) Inventors: Masahiro Murase, Tokyo (JP); Jun Saito, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/482,083

(22) Filed: Apr. 7, 2017

(65) Prior Publication Data

US 2017/0291598 A1 Oct. 12, 2017

(30) Foreign Application Priority Data

Apr. 8, 2016 (JP) ................. 2016-077851

(51) Int. Cl.
| | |
|---|---|
| *B60W 20/40* | (2016.01) |
| *B60K 6/442* | (2007.10) |
| *B60W 20/20* | (2016.01) |
| *B60W 50/14* | (2012.01) |
| *B60K 6/44* | (2007.10) |

(Continued)

(52) U.S. Cl.
CPC ............... *B60W 20/40* (2013.01); *B60K 6/44* (2013.01); *B60K 6/442* (2013.01); *B60K 35/00* (2013.01); *B60W 10/06* (2013.01); *B60W 10/08* (2013.01); *B60W 20/10* (2013.01); *B60W 20/20* (2013.01); *B60W 50/14* (2013.01); *B60K 2350/106* (2013.01); *B60K 2350/1092* (2013.01); *B60W 2050/146* (2013.01); *B60W 2510/244* (2013.01); *B60W 2510/246* (2013.01); *B60W 2540/10* (2013.01); *B60Y 2200/92* (2013.01); *Y02T 10/6286* (2013.01); *Y02T 10/84* (2013.01); *Y10S 903/903* (2013.01)

(58) Field of Classification Search
CPC .................................................... B60W 20/40
See application file for complete search history.

(56) References Cited

U.S. PATENT DOCUMENTS

| | | | | |
|---|---|---|---|---|
| 2009/0125173 A1* | 5/2009 | Komatsu | ............... | B60K 6/445 701/22 |
| 2009/0243827 A1* | 10/2009 | Burke | ................ | G01D 11/28 340/439 |
| 2013/0038439 A1* | 2/2013 | Saito | ..................... | B60K 6/445 340/439 |

FOREIGN PATENT DOCUMENTS

| | | |
|---|---|---|
| CN | 103764465 A | 4/2014 |
| JP | 2013-14219 A | 1/2013 |

OTHER PUBLICATIONS

Chinese Office Action and Search Report, dated Feb. 3, 2019, for Chinese Application No. 201710224093.X, with English translations.

\* cited by examiner

*Primary Examiner* — Imran K Mustafa
(74) *Attorney, Agent, or Firm* — Birch, Stewart, Kolasch & Birch, LLP

(57) ABSTRACT

A driving support apparatus for a hybrid vehicle including an engine and a motor, in which the engine starts running when any one of parameters indicating a state of the hybrid vehicle reaches an engine start threshold set for the parameters, the driving support apparatus includes a current value acquiring section that acquires current values of the parameters, a margin calculation section that calculates margin levels for the current values of the parameters for keeping the engine stopping using the current values of the param- (Continued)

eters and the engine start thresholds, and an output section that outputs the smallest margin level of the calculated margin levels.

8 Claims, 4 Drawing Sheets

(51) Int. Cl.
    *B60W 10/06*     (2006.01)
    *B60W 10/08*     (2006.01)
    *B60W 20/10*     (2016.01)
    *B60K 35/00*     (2006.01)

DRIVING SUPPORT APPARATUS

CROSS REFERENCE TO RELATED APPLICATION

This application is based on Japanese Patent Application No. 2016-077851 filed on Apr. 8, 2016, the contents of which are incorporated herein by reference.

BACKGROUND OF THE INVENTION

1. Technical Field

The present invention relates to a driving support apparatus for supporting driving of a vehicle.

2. Related Art

Conventionally, a hybrid vehicle including an engine and a motor travels with an EV traveling mode in which only the motor is driven to travel, a series traveling mode in which the vehicle travels with the driving force of the motor while driving the engine to generate electricity, and a parallel traveling mode in which the vehicle travels with the driving force of the engine and the motor. Those modes are switched as necessary.

A technique which enables changing the priority of such traveling modes by the operation of a driver has been proposed.

For example, JP-A-2013-014219 discloses a technique in which when the setting (EV travel priority mode) for maintaining the engine stopped state in order to reduce the fuel consumption amount and the exhaust gas emission amount is performed, even if the state of charge (SOC) of the battery is low, the engine is stopped as intended by the driver and avoiding imparting a feeling of strangeness to the driver.

Conventionally, even when the EV travel priority mode is set, the engine is started when the vehicle is in a predetermined state. The predetermined state is, for example, a case where the state of charge of the battery is low, a case where the required output becomes larger, a case where the battery voltage drops, a case where the battery temperature deviates from a predetermined range, or the like.

Of these parameters, for example, the state of charge is displayed on the instrument panel or the like of the vehicle, and the required output is linked with the driving operation of the driver (the depression amount of the accelerator pedal). Therefore, the driver easily grasps the state of them and the required output. When the engine is started due to these parameters, there is a low possibility that the driver feels discomfort.

On the other hand, when the engine is started due to a parameter such as the battery voltage and battery temperature that the driver cannot grasp the state of them, the driver cannot grasp the cause of starting the engine and may feel uncomfortable.

The present invention has been made in view of the above-described matters, and an object of the present invention is to enable a driver to grasp start timing of an engine in a hybrid vehicle.

SUMMARY OF THE INVENTION

According to an aspect of the invention, a driving support apparatus for a hybrid vehicle includes an engine and a motor, in which the engine starts running when any one of parameters indicating a state of the hybrid vehicle reaches an engine start threshold set for the parameters. The driving support apparatus includes a current value acquiring section that acquires current values of the parameters, a margin calculation section that calculates margin levels for the current values of the parameters for keeping the engine stopping using the current values of the parameters and the engine start thresholds, and an output section that outputs the smallest margin level of the calculated margin levels.

According to the above configuration, there is an advantage for the driver to easily know the margin level for keeping the EV traveling without starting the engine because the margin level for each of a plurality of parameters related to the starting of the engine is calculated and the smallest margin level is presented to the driver. It is thought that, in a case where there is a possibility that the engine starts due to the parameters other than the parameters including the state of charge and the required output which the driver is conventionally able to know, the driver can grasp factors of starting the engine, thereby improving the convenience.

The margin calculating section may be configured to calculate one of the margin levels by dividing a differences between one of the current values of the parameters and a corresponding engine starting threshold by a difference between a value most distant from the corresponding engine starting threshold within a possible value range of the one of the current values and the corresponding engine starting threshold.

The driving support apparatus may further includes a display unit that includes a display area in which an area corresponding to the smallest margin level is displayed with a color difference from that of the other regions.

When the smallest margin level is the maximum value, the area may have the maximum area, and when the smallest margin level is the minimum value, the area may be substantially zero.

The output unit may output a notification to a driver of the hybrid vehicle when the parameter corresponding to the smallest margin level changes during traveling.

The parameters may include at least one of a state of charge of a battery of the hybrid vehicle, a value of required output to the hybrid vehicle, a voltage of the battery, a temperature of the battery.

DETAILED DESCRIPTION OF THE EMBODIMENT

Preferred embodiments of a driving support apparatus according to the present invention will be described in detail below with reference to the accompanying drawings.

Figure 1:
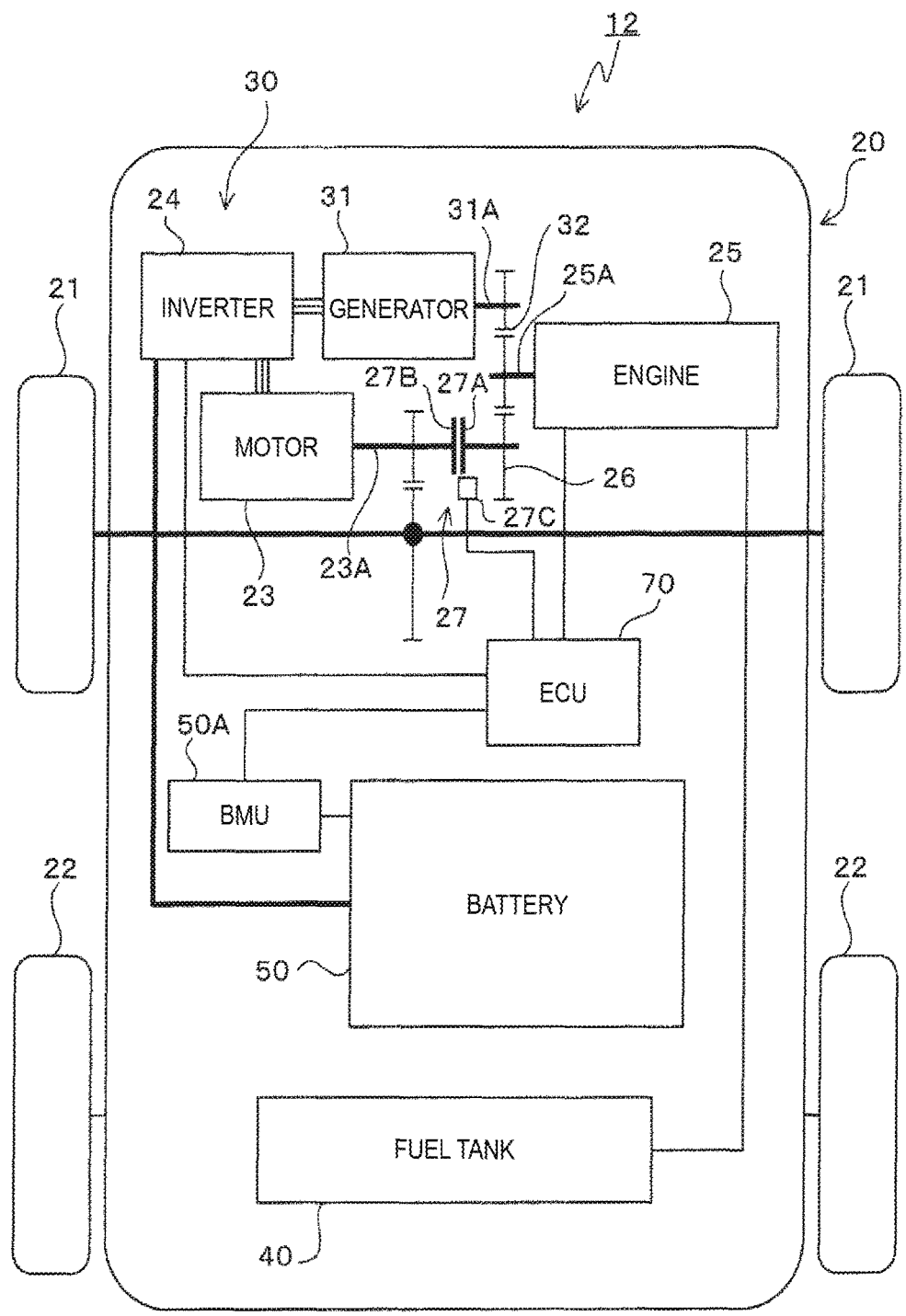
FIG. 1 is an explanatory diagram showing a configuration of a hybrid vehicle 12 according to an embodiment.
Figure 2:
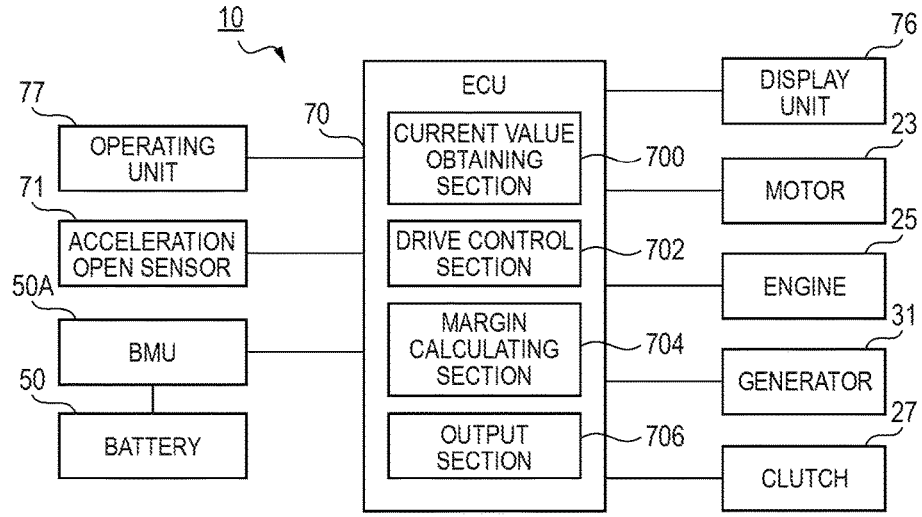
FIG. 2 is a block diagram showing a peripheral configuration of a driving support apparatus.

FIG. 1 is an explanatory diagram showing a configuration of a hybrid vehicle 12 equipped with a driving support apparatus 10 according to an embodiment. FIG. 2 is a block diagram showing a peripheral configuration of the driving support apparatus 10. As shown in FIG. 1, the hybrid vehicle 12 includes a traveling system 20, a power generation system 30, and an ECU 70. The traveling system 20 is a driving mechanism of the hybrid vehicle 12 and includes front wheels 21, rear wheels 22, a motor 23, an inverter 24, an engine 25, a transmission mechanism 26 for transmitting rotation of an output shaft 23A of the motor 23 and rotation of an output shaft 25A of the engine 25 to the front wheels 21, a fuel tank 40, and a battery 50.

The front wheels 21 and the rear wheels 22 are each constituted by two wheels paired in the vehicle width direction. In the present embodiment, the front wheels 21 are drive wheels of the motor 23 and the engine 25.

The motor 23 is driven by using the electric power accumulated in the battery 50, and outputs the rotational force (torque) from the output shaft 23A. The motor 23 may perform regenerative operation when decelerating the hybrid vehicle 12 (for example, when the accelerator pedal is released) and perform regenerative power generation. The electric power generated by the regenerative power generation is supplied to the battery 50 via the inverter 24 to charge the battery 50.

The inverter 24 adjusts the electric power of the battery 50 according to the driver's request and supplies it to the motor 23. The driver's request includes, for example, the operation of an accelerator pedal, a brake pedal, a shift lever (not shown) or the like, and a vehicle speed measured by a vehicle speed sensor, etc. The ECU 70 described later calculates a required output from the driver's request and controls the inverter 24 based on the calculated required output.

The engine 25 is driven by combusting the fuel supplied from the fuel tank 40 in the combustion chamber. As an example, the engine 25 is a reciprocating engine using gasoline as a fuel. The driving of the engine 25 is controlled by the ECU 70 described later.

The transmission mechanism 26 transmits the rotation of the output shaft 23A of the motor 23 to the front wheels 21 and the rotation of the output shaft 25A of the engine 25 to the front wheels 21. The transmission mechanism 26 includes a clutch device 27. The clutch device 27 includes a pair of clutch plates 27A and 27B and a driving portion 27C with which the clutch plates 27A and 27B comes into contact with each other and the contact state is released.

The clutch plate 27A rotates integrally with the output shaft 25A of the engine 25. The clutch plate 27B rotates integrally with the output shaft 23A of the motor 23. When the clutch plates 27A and 27B are brought into contact with each other by the driving portion 27C, the clutch plates 27A, 27B rotate integrally with each other. As a result, the rotation of the output shaft 25A of the engine 25 is transmitted to the front wheels 21. When the clutch plates 27A and 27B are separated from each other by the driving portion 27C, the rotation of the output shaft 25A of the engine 25 is not transmitted to the front wheels 21. The drive unit 27C is controlled by the ECU 70 described later.

The fuel tank 40 stores fuel (gasoline, for example) which is a power source of the engine 25. The battery 50 accumulates electric power which is a power source of the motor 23. Charging of the battery 50 may be performed by power generation by the generator 31, regenerative power generation by the motor 23, supply of external power from a charge connector (not shown) provided in the vehicle body of the hybrid vehicle 12. A BMU (Battery Monitoring Unit) 50A is connected to the battery 50. The BMU 50A detects the voltage and temperature of the battery 50, the input/output current of the battery 50, and the like, and detects the state of the battery 50 including the state of charge (SOC). The BMU 50A transmits the state of the battery 50 (state of charge, battery voltage, battery temperature, etc.) to the ECU 70.

More specifically, the battery 50 is configured by connecting a plurality of battery cells in series. Each battery cell is provided with a voltmeter and a thermometer, and measures the cell voltage and cell temperature of each battery cell. The voltmeter and the temperature may be provided for each cell unit composed of a predetermined number of battery cells. The measured values of the voltmeter and the thermometer are input to the BMU 50A.

In addition, an ammeter is provided between the battery 50 and a device operating under the supply of electric power from the battery 50 (the motor 23 in the present embodiment), and measures the output current from the battery 50. The measured value of the ammeter is input to the BMU 50A.

The power generation system 30 is a mechanism for charging the battery 50, and includes an engine 25, a generator 31, and an inverter 24.

The rotation of the output shaft 25A of the engine 25 is transmitted to the rotation shaft 31A of the generator 31 via the second transmission mechanism 32. When the generator 31 becomes ready for power generation under the control of the ECU 70, the rotary shaft 31A rotates by receiving the rotation of the output shaft 25A of the engine 25 and the generator 31 generates electricity. The generator 31 is connected to the inverter 24, and the AC power generated by the generator 31 is converted into DC power by the inverter 24 and accumulated in the battery 50.

Further, in the series traveling mode described later, the AC power generated by the generator 31 is directly used for driving the motor 23. In this case, the generated power of the generator 31 is supplied to the motor 23 after the frequency is appropriately converted by the inverter 24.

The generator 31 also functions as an electric motor (starter) when starting the engine 25. When starting the engine 25, the ECU 70 controls the inverter 24 to drive the generator 31. As the generator 31 is driven, the rotating shaft 31A rotates. Since the rotary shaft 31A is connected to the output shaft 25A of the engine 25 via the second transmission mechanism 32, when the generator 31 is driven and the rotary shaft 31A rotates, it is possible to rotate the output shaft 25A of the engine 25.

The display unit 76 displays various kinds of information indicating the state of the hybrid vehicle 12 so that the driver may visually recognize it. In the present embodiment, the margin level for keeping the EV traveling without starting the engine is displayed during the EV travel priority mode described later.

The display unit 76 is provided, for example, in an instrument panel of a driver's seat, and displays the state of charge of the battery 50, the traveling speed of the hybrid vehicle 12, etc. in addition to the margin up to the above-described engine start.

The operation unit 77 receives various settings relating to the traveling of the hybrid vehicle 12. The operation section 77 includes, for example, a switch or the like provided in the periphery of the instrument panel of the driver's seat or the steering wheel or the like.

In the present embodiment, the operation unit 77 receives a setting operation for transition to the EV travel priority mode. The EV travel priority mode is a mode in which traveling in the EV traveling mode described later is continued as much as possible. Since the engine 25 is stopped in the EV traveling mode, it is effective in minimizing fuel consumption, or useful in controlling emission of exhaust gas, for example.

Further, as the other priority mode that may be set by the operation unit 77, for example, a SOC priority mode in which the state of charge of the battery 50 is maintained close to 100%, a charge priority mode in which the battery 50 is actively charged to increase the state of charge, or the like may be provided.

The ECU 70 is a control unit that entirely controls the hybrid vehicle 12.

The ECU 70 includes a CPU, a ROM for storing a control program and the like, a RAM as an operation area of the control program, an EEPROM for rewritably holding various data, an interface unit for communicating with a peripheral circuit, and the like.

The ECU 70 perform functions as a current value acquiring section 700, a drive control section 702, a margin calculation section 704, and an output section 706 by executing the control program by the CPU.

The current value acquiring section 700 acquires the current value of the parameter group used when switching between the three driving modes described later.

The parameter group acquired by the present value acquiring section 700 includes at least one of a state of charge of the battery 50 of the hybrid vehicle 12, a request output to the hybrid vehicle 12, and a battery voltage of the battery 50, and so on. Besides this, for example, the battery temperature of the battery 50 may be included in the parameter group.

The required output to the hybrid vehicle 12 is obtained, for example, by obtaining the detection value of the accelerator opening degree sensor 71 indicating the operation amount of the accelerator pedal.

Further, the state of charge of the battery 50, the battery voltage, the battery temperature, and the like can be acquired from the BMU 50A. The battery voltage and the battery temperature may be obtained individually for all the battery cells constituting the battery 50, or may be an average value of the values of these battery cells.

The drive control section 702 controls each unit of the hybrid vehicle 12, for example, the motor 23, the engine 25, the generator 31, the drive unit 27C of the clutch device 27, and the like, based on the parameter group acquired by the current value acquisition section 700.

The drive control section 702 appropriately switches the three driving modes of the hybrid vehicle 12 including:
1. EV traveling mode;
2. Series traveling mode;
3. Parallel traveling mode,
to drive the hybrid vehicle 12.

1. EV (Electric Vehicle) Travelling Mode

In an EV travelling mode, the engine 25 is stopped and the vehicle runs by rotating the axle with the driving force of the motor 23. The electric power supplied to the motor 23 in the EV travelling mode is the electric power accumulated in the battery 50.

2. Series Travelling Mode

In a series travelling mode, the vehicle is driven by rotating the axle with the driving force of the motor 23 while driving the generator 31 with the engine 25. The electric power supplied to the motor 23 in the series traveling mode is the electric power accumulated in the battery 50 and generated electric power generated by the generator 31.

For example, when the state of charge of the battery 50 decreases or when the required output becomes equal to or higher than the predetermined value at the time of low speed, the vehicle may switch from the EV traveling mode to the series traveling mode.

3. Parallel Travelling Mode

In a parallel travelling mode, the vehicle is driven by rotating the axle with the driving force of the engine 25 and the driving force of the motor 23.

In particular, when the efficiency of the axle drive by the engine 25 is high, such as at high speed, the vehicle may switch to the parallel traveling mode. In the parallel traveling mode, it is possible to transmit the driving force of the engine 25 to the generator 31 to generate electricity. That is, the driving force of the engine 25 is distributable to both the traveling and the electric power generation.

Only the motor 23 is driven in the EV travelling mode. The motor 23 and the engine 25 are driven in the series travelling mode and the parallel travelling mode. Generally, the hybrid vehicle 12 starts traveling in the EV traveling mode, and thereafter, when any one of the parameter groups showing the state of the hybrid vehicle 12 reaches an engine start threshold set for the parameters, and the engine 25 is started and shifts to the series traveling mode or the parallel traveling mode.

The drive control section 702 changes the engine start threshold set for each parameter in accordance with the setting operation on the operation unit 77.

For example, when the EV travel priority mode is set, the engine start threshold value for the state of charge of the battery 50 is lowered so as not to start the engine 25 until the state of charge reaches the lowered engine start threshold. Further, the engine start threshold for the required output is increased so as not to start the engine 25 until a larger output is requested. Similarly, the other engine start thresholds for the other parameters are changed so that the engine 25 is difficult to start up.

The margin calculation section 704 calculates the margin level for keeping the EV traveling without starting the engine 25 by using the current value of each parameter and the engine start threshold value during the EV traveling mode in which the hybrid vehicle 12 is traveling without running engine. The larger the margin is, the more difficult the engine 25 starts. The smaller the margin is, the easier the engine 25 starts.

The margin calculating section 704 calculates the margin level by dividing a difference between a current value of each parameter and an engine starting threshold by a difference between a value most distant from the engine starting threshold within a possible value range and the engine starting threshold.

That is, the margin level to start the engine in each parameter is calculated by the following equation 1.

$$\text{Margin level} = (\text{current value} - \text{engine starting threshold}) / (\text{parameter value most distant from the engine starting threshold} - \text{engine starting threshold}) \quad (1)$$

Figure 3A:
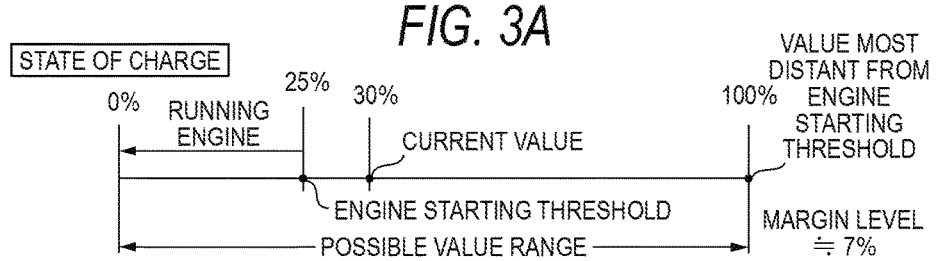
FIGS. 3A to 3C are diagrams schematically showing a margin calculating method by a margin calculating section 704.
Figure 3B:
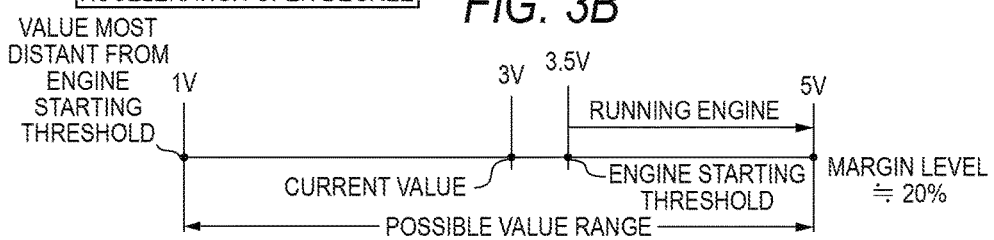
Figure 3C:
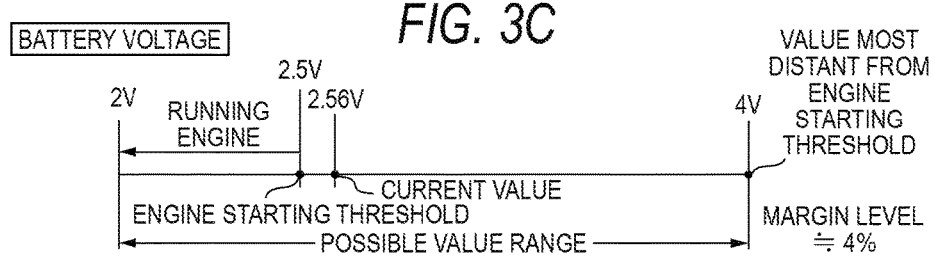

FIGS. 3A to 3C are diagrams schematically showing a margin calculation method by the margin calculation section 704.

FIG. 3A shows the case where the parameter is the state of charge of the battery 50. In this case, it is assumed that the state of charge is within a range from 0% to 100%, and the engine starting threshold is 25%. When the state of charge reaches 25% or less, the engine 25 starts to start power generation. In this case, the value furthest from the engine starting threshold value within the possible value range is "state of charge 100%".

Assuming that the current value of the state of charge is 30%, the margin level is calculated using the formula (1) as follow:

(30−25)/(100−25)=0.066

The margin level is about 7%.

FIG. 3B shows a case where the parameter is the request output. In the present embodiment, the detection value of the accelerator opening degree sensor 71 is used as the required output. It is assumed that the value of the accelerator opening sensor value is within 1 V to 5 V and the larger the accelerator operation amount is, the larger the voltage value becomes. That is, the larger the required output is, the larger the voltage value becomes. Further, it is assumed that the engine start threshold is 3.5 V. When the voltage value becomes 3.5 V or more, the engine 25 starts and power generation or wheel driving is started. In this case, the value furthest from the engine starting threshold value within the possible value range is "accelerator opening degree sensor value 1 V".

Assuming that the current value of the request output is 3 V, the margin level is calculated using the formula (1) as follow:

(3−3.5)/(1−3.5)=0.2

The margin level is 20%.

FIG. 3C shows a case where the parameter is the battery voltage of the battery 50. It is assumed that the value of the battery voltage is within 2.0 V to 4.0 V, and the engine start threshold is 2.5 V. The engine 25 starts and starts generating electricity when the battery voltage becomes 2.5 V or less. In this case, the value furthest from the engine starting threshold value among the possible value range is "battery voltage 4.0 V".

Assuming that the current value of the battery voltage is 2.56 V, the margin level is calculated using the formula (1) as follow:

(2.56−2.5)/(4.0−2.5)=0.04

The margin level is 4%.

Returning to FIG. 2, the output section 706 outputs the smallest value among the margin levels calculated for the respective parameters. In the example of FIGS. 3A to 3C, the output part 706 outputs "4%" as the margin level for keeping the EV traveling without starting engine 25 because 4% as the margin level relating to the battery voltage is the smallest value.

The reason for outputting the smallest value of the margin levels is that the engine 25 is started when any one of the parameters reaches the engine starting threshold. That is, the margin level for keeping the EV traveling without starting the engine 25 of the hybrid vehicle 12 is indicated by the smallest value among the margin levels calculated for the plurality of parameters.

In the present embodiment, the output section 706 notifies the driver of the margin level by displaying it on the display unit 76. The output form of the margin level on the output section 706 is not limited to display, but various modes such as conventional ways including sound notification may be applied.

Figure 4A:
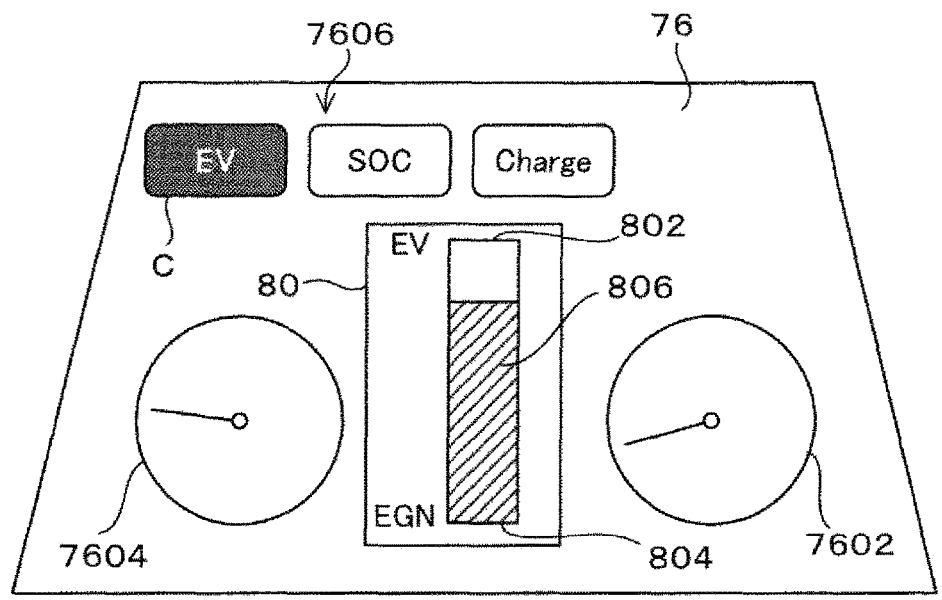
FIGS. 4A and 4B are diagrams showing examples of a method of displaying the margin level on the display unit.
Figure 4B:
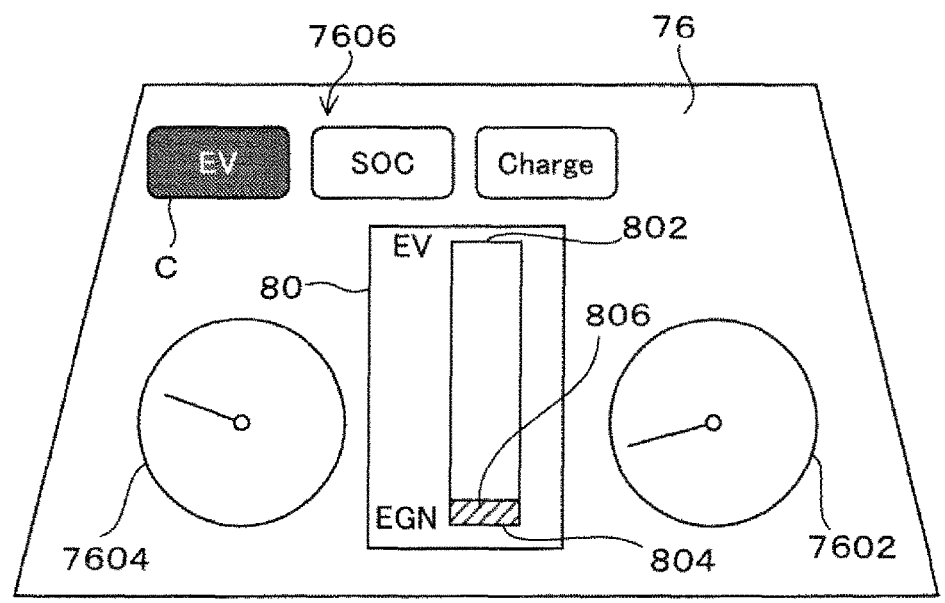

FIGS. 4A and 4B are diagrams showing an example of a method of displaying the margin level on the display unit 76.

FIG. 4A shows a display when the margin level is about 70%, and FIG. 4B shows a display when the margin level is about 10%.

The display unit 76 may include a margin level display 80, a traveling speed display 7602, a motor rotation number display 7604, a state of charge indication (not shown), and the like.

FIGS. 4A and 4B shows the priority mode set via the operation unit 77. The priority mode display 7606 is configured by icons indicating priority modes that are selectable via the operation unit 77. In the example of FIG. 4A, the EV travel priority mode is selected, and the icon C marked "EV" is lit.

The margin level display 80 may be displayed only when the EV travel priority mode is selected or may be always displayed irrespective of the setting of the priority mode.

In the margin level display 80 of FIGS. 4A and 4B, an area 806 corresponding to the margin level is displayed with a color different from that of other areas. In FIGS. 4A and 4B, the area 806 is indicated by hatching. When the margin level is the maximum value, the area 806 is maximized, and when the margin level is the minimum value, the area 806 is minimized, an area of which is substantially zero. That is, the upper end 802 of the vertically elongated rectangular indicator corresponds to "margin level 100%" and the lower end 804 corresponds to "margin level 0%". A height of the area 806 from the lower end 804 of the indicator corresponds to the margin level. The height of the area 806 from the lower end 804 is about seven tenth in FIG. 4 and about one tenth in FIG. 4B.

As the area of the area 806 decreases, the margin for keeping the EV traveling without starting the engine decreases. It is thought that the engine start timing can be intuitively notified to the driver with the display of the margin level display 80.

The margin level may be displayed using not only a rectangular indicator as shown in FIGS. 4A and 4B but also a circle or a fan-shaped indicator such as a fuel gauge.

A kind of the parameters which has been used for calculating the margin level displayed as the area 806 in the margin level display 80 may be displayed. That is, a kind of the parameters having the lowest margin level may be displayed. In this case, the driver may perform the driving operation while paying attention to the parameters, and it is thought that it may be possible to avoid reducing the margin level.

There is a case where a kind of the parameter having the smallest margin level may change during traveling. For example, this case may occur when the margin level of the state of charge is the lowest of all and the margin level of the state of charge is displayed, the operation amount of the accelerator pedal increases, the margin level of the required output decreases, and the margin level of the required output becomes the lowest of all parameters, for example. In this case, the change of the kind of the parameter having the minimum margin may be notified to the driver by voice sound, display or the like. This may motivate the driver to suppress the engine startup. That is, according to the above example, the driver may take measures, for example, by suppressing the operation amount of the accelerator pedal and increasing the margin level of the required output so as not to start the engine.

Figure 5:
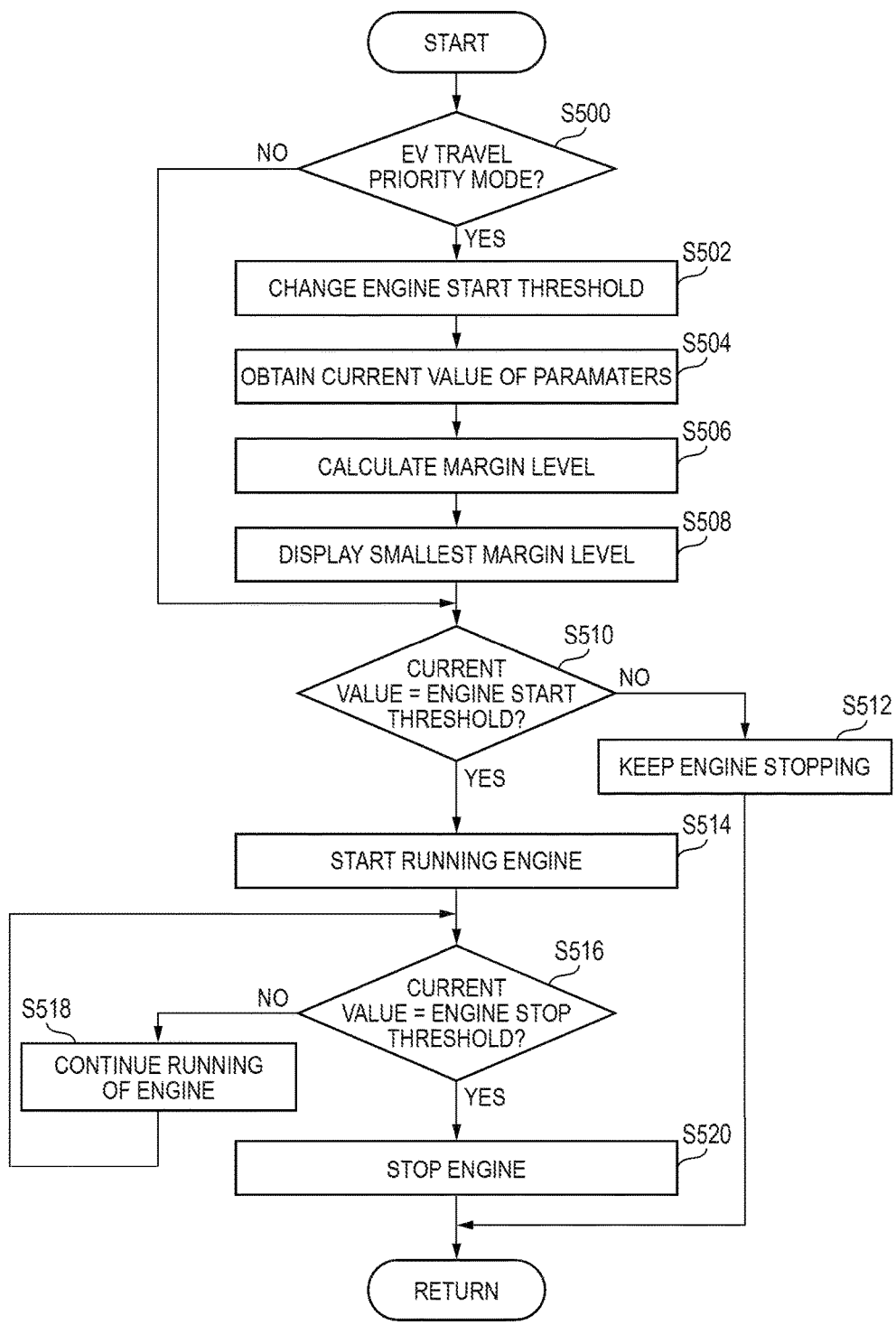
FIG. 5 is a flowchart showing a processing procedure of the driving support apparatus.

FIG. 5 is a flowchart showing a processing procedure of the driving support apparatus 10.

In the flowchart of FIG. 5, it is assumed that the margin level for keeping the EV traveling without starting the engine is displayed only when the EV travel priority mode is set. It is assumed that, in the initial state, the engine 25 is not running and the hybrid vehicle 12 travels in the EV traveling mode.

When the setting operation to the operation section 77 is performed to set the EV travel priority mode (step S500), the drive control section 702 changes the engine start thresholds of the parameter group. With the changing of the threshold, the engine 25 becomes hard to start (step S502).

The current value acquiring section 700 acquires the current value of the parameter group including state of charge of the battery 50 in the hybrid vehicle 12, the required output of the hybrid vehicle 12, and a battery voltage of the battery 50 (step S504).

Margin calculation section 704 uses the current value of each parameter and the engine start threshold to calculate the margin level for keeping the EV traveling without starting the engine 25 for each parameter (step S506).

Then, the output section 706 outputs the smallest value among the margin levels calculated for each parameter as margin level of the hybrid vehicle for keeping the EV traveling without starting the engine 25 (step S508). When the margin level is 0% at step S508, that is, the engine 25 is starting immediately, the margin level of 0% is displayed.

If any of the parameter group does not reach the engine start threshold (Step S510: No), the EV mode is maintained without starting the engine 25 (step S512), the process returns to step S500, and repeats the processing subsequent to the step S500.

Also, if any one of the parameter group reaches the engine start threshold (Step S510: Yes), the drive control section 702 starts the engine 25 and make a mode transition to the series traveling mode or the parallel traveling mode (Step S514).

Until the parameter having reached the engine start threshold reaches an engine stop threshold in step S510 (Step S516: No), the drive control section 702 continues the running of the engine 25 (step S518). When the parameter reaches the engine stop threshold (step S516: Yes), the engine 25 is stopped and the hybrid vehicle transits to to the EV traveling mode (step S520). Then, the process returns to step S500 to repeat the processing subsequent to the step S500.

As described above, according to the driving support apparatus 10 in the embodiment, there is an advantage for the driver to easily know the margin level for keeping the EV traveling without starting the engine 25 because the margin level for each of a plurality of parameters related to the starting of the engine 25 is calculated and the smallest margin level is presented to the driver. It is thought that, in a case where there is a possibility that the engine 25 starts due to the parameters other than the parameters including the state of charge and the required output which the driver is conventionally able to know, the driver can grasp factors of starting the engine 25, thereby improving the convenience.

According to the driving support apparatus 10, a plural kinds of parameters having different numerical ranges and different engine start thresholds are compared with each other at the same scale. There is advantage that the driver can quickly know the margin level.

Further, according to the driving support apparatus 10, it is thought that the driver can intuitively know the margin level even during driving operation, thereby the convenience is improved.

What is claimed is:

1. A driving support apparatus for a hybrid vehicle including an engine and a motor, in which the engine starts running when any one of a plurality of parameters indicating states of the hybrid vehicle reaches an engine start threshold set for each of the plurality of parameters, the driving support apparatus comprising:
a current value acquiring section that acquires current values of each of the plurality of parameters;
a margin calculation section that calculates margin levels for the current values of the plurality of parameters for keeping the engine stopping using the current values of the plurality of parameters and the engine start threshold set for each of the plurality of the plurality of parameters;
a drive control section that maintains the engine in a stopped state when all of the acquired current values of the plurality of parameters are lower than the engine start threshold set for each of the plurality of parameters, and starts the engine when any one of the acquired current values of the plurality of parameters reaches a corresponding engine start threshold, the drive control section also selects a smallest margin level among the calculated margin levels; and
an output section that outputs only the smallest margin level selected among the calculated margin levels to notify a driver of the hybrid vehicle that the engine will start when the output smallest margin level reaches the engine start threshold.

2. The driving support apparatus according to claim 1, wherein the margin calculating section calculates one of the margin levels by dividing a differences between one of the current values of the parameters and a corresponding engine starting threshold by a difference between a value most distant from the corresponding engine starting threshold within a possible value range of the one of the current values and the corresponding engine starting threshold.

3. The driving support apparatus according to claim 1, further comprising:
a display unit that includes a display area in which an area corresponding to the smallest margin level is displayed with a color difference from that of the other regions.

4. The driving support apparatus according to claim 2, further comprising:
a display unit that includes a display area in which an area corresponding to the smallest margin level is displayed with a color difference from that of the other regions.

5. The driving support apparatus according to claim 3, wherein when the smallest margin level is the maximum value, the area has the maximum area, and when the smallest margin level is the minimum value, the area is substantially zero.

6. The driving support apparatus according to claim 4, wherein when the smallest margin level is the maximum value, the area has the maximum area, and when the smallest margin level is the minimum value, the area is substantially zero.

7. The driving support apparatus according to claim 1, wherein the parameters include at least one of a state of charge of a battery of the hybrid vehicle, a value of required output to the hybrid vehicle, a voltage of the battery, or a temperature of the battery.

8. The driving support apparatus according to claim 1, wherein the output unit outputs a notification to a driver of the hybrid vehicle when the parameter corresponding to the smallest margin level changes during traveling.

* * * * *